(12) United States Patent
Kudo

(10) Patent No.: US 7,711,466 B2
(45) Date of Patent: May 4, 2010

(54) VEHICLE DRIVING CONTROL UNIT

(75) Inventor: Shinya Kudo, Tokyo (JP)

(73) Assignee: Fuji Jukogyo Kabushiki Kaisha, tokyo (JP)

( * ) Notice: Subject to any disclaimer, the term of this patent is extended or adjusted under 35 U.S.C. 154(b) by 142 days.

(21) Appl. No.: 11/971,538

(22) Filed: Jan. 9, 2008

(65) Prior Publication Data

US 2008/0319612 A1    Dec. 25, 2008

(30) Foreign Application Priority Data

Jan. 11, 2007  (JP)  .............................. 2007-003848

(51) Int. Cl.
*B62D 6/00*    (2006.01)
(52) U.S. Cl. ........................ 701/42; 701/41; 701/301; 180/443; 340/435
(58) Field of Classification Search .................... 701/41, 701/42, 43, 301; 180/443, 446; 318/52, 318/587; 340/439, 903, 435
See application file for complete search history.

(56) References Cited

U.S. PATENT DOCUMENTS 5,642,093 A * 6/1997 Kinoshita et al. ........... 340/439
6,226,580 B1 * 5/2001 Noro et al. .................... 701/42

FOREIGN PATENT DOCUMENTS

JP    07-160994    6/1995

* cited by examiner

*Primary Examiner*—Gertrude Arthur Jeanglaud
(74) *Attorney, Agent, or Firm*—Smith, Gabrell & Russell

(57) ABSTRACT

A control unit 3 estimates a driving target point $P_t$ based on obstacle information which is recognized by a stereoscopic camera 4 and an environment recognition unit 5, and estimates a position of an obstacle based on a current relative position between a vehicle and the obstacle and information of a traveling of the vehicle. Then, the control unit 3 sets the driving target point $P_t$ to a position by adding a driving target point traveling distance $i_{fx0}$ over which the vehicle 1 travels in a lateral direction based on a steering torque $f_0$ and a preset safety spacing $S_x$. The control unit 3 controls the steering of the vehicle 1 so as to be directed toward the driving target point.

6 Claims, 6 Drawing Sheets

VEHICLE DRIVING CONTROL UNIT

CROSS-REFERENCE TO RELATED APPLICATION

The disclosure of Japanese Patent Application No. 2007-003848 filed on Jan. 11, 2007 including the specification, drawings and abstract is incorporated herein by reference in its entirety.

BACKGROUND OF THE INVENTION

1. Field of the Invention

The present invention relates to a vehicle driving control unit for avoiding an obstacle which exists ahead of a vehicle.

2. Related Art

In recent years, driving control units for detecting an obstacle existing ahead on a driving path of a subject vehicle and guiding the subject vehicle to dodge the detected obstacle have been developed and used in order to reduce a driving stress of a driver and to improve a safety of the vehicle.

In JP-A-07-160994, for example, a technique is disclosed in which a steering actuator is controlled based on information on a driving lane to thereby steer a vehicle, so as to allow the vehicle to be driven along the driving lane. Then, in the technique, when an obstacle exists ahead on the driving lane of the vehicle, an obstacle avoidance steering control is executed, so that the vehicle is steered based on a programmed steering control which follows a preset steering mode based on a relative distance and relative speed between the vehicle and the obstacle from the vehicle starts an obstacle avoidance operation until the vehicle enters an obstacle avoidance area.

However, in the driving control of JP-A-07-160994, since the obstacle avoidance is executed based on the programmed steering control which follows the preset steering mode, a driver's will may not be reflected to the avoidance of the obstacle, and the driver may have uncomfortable feeling.

SUMMARY OF THE INVENTION

One or more embodiments of the invention provide a vehicle driving control unit which can perform an optimal automatic obstacle avoidance intended by a driver according to a relationship between a vehicle and an obstacle, without causing uncomfortable feeling of the driver.

In accordance with one or more embodiments of the invention, a vehicle driving control unit is provided with: a three-dimensional object detection portion for detecting three-dimensional objects in a driving environment; an obstacle recognition portion for recognizing an obstacle which interferes a traveling of a vehicle within the three-dimensional objects detected by the three-dimensional object detection portion; a steering torque detection portion for detecting a steering torque exerted by a driver; a driving target setting portion for setting a driving target point on a side of the obstacle recognized by the obstacle recognition portion based on at least the steering torque; and a control portion for setting vehicle motion parameters based on a vehicle motion model and controlling a steering of the vehicle so as to direct the vehicle toward the driving target point.

In the vehicle driving control unit, an optimum automatic obstacle avoidance intended by the driver may be performed based on a relationship between a vehicle and an obstacle without causing the driver's uncomfortable feeling.

Other aspects and advantages of the invention will be apparent from the following description and the appended claims.

DETAILED DESCRIPTION OF EXEMPLARY EMBODIMENTS

Hereinafter, an exemplary embodiments of the invention will be described based on the drawings.

FIGS. 1 to 5(f) show an exemplary embodiment of the invention.

Figure 1:
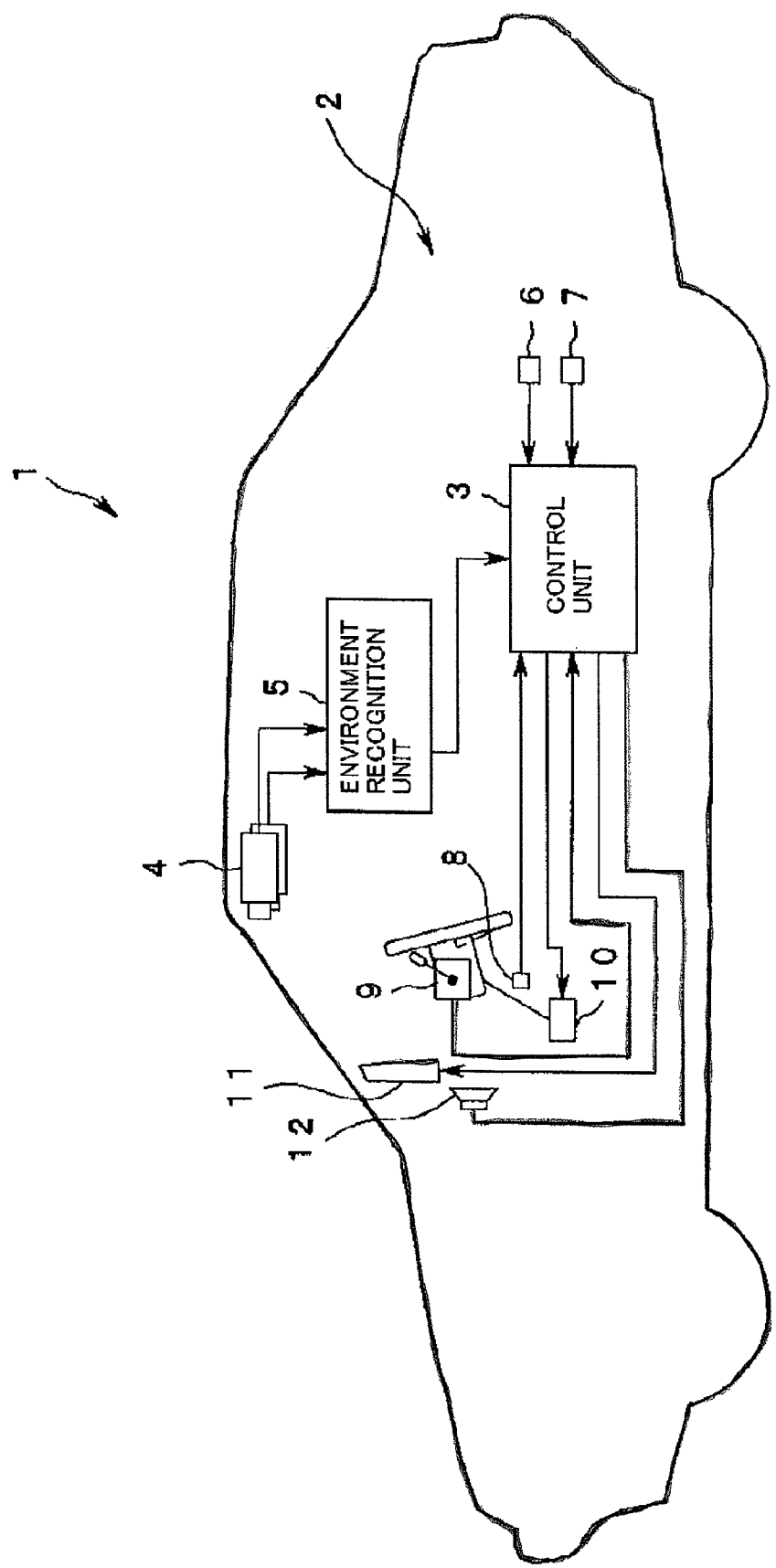
FIG. 1 is a schematic explanatory drawing showing the entirety of a vehicle driving control unit.
Figure 2:
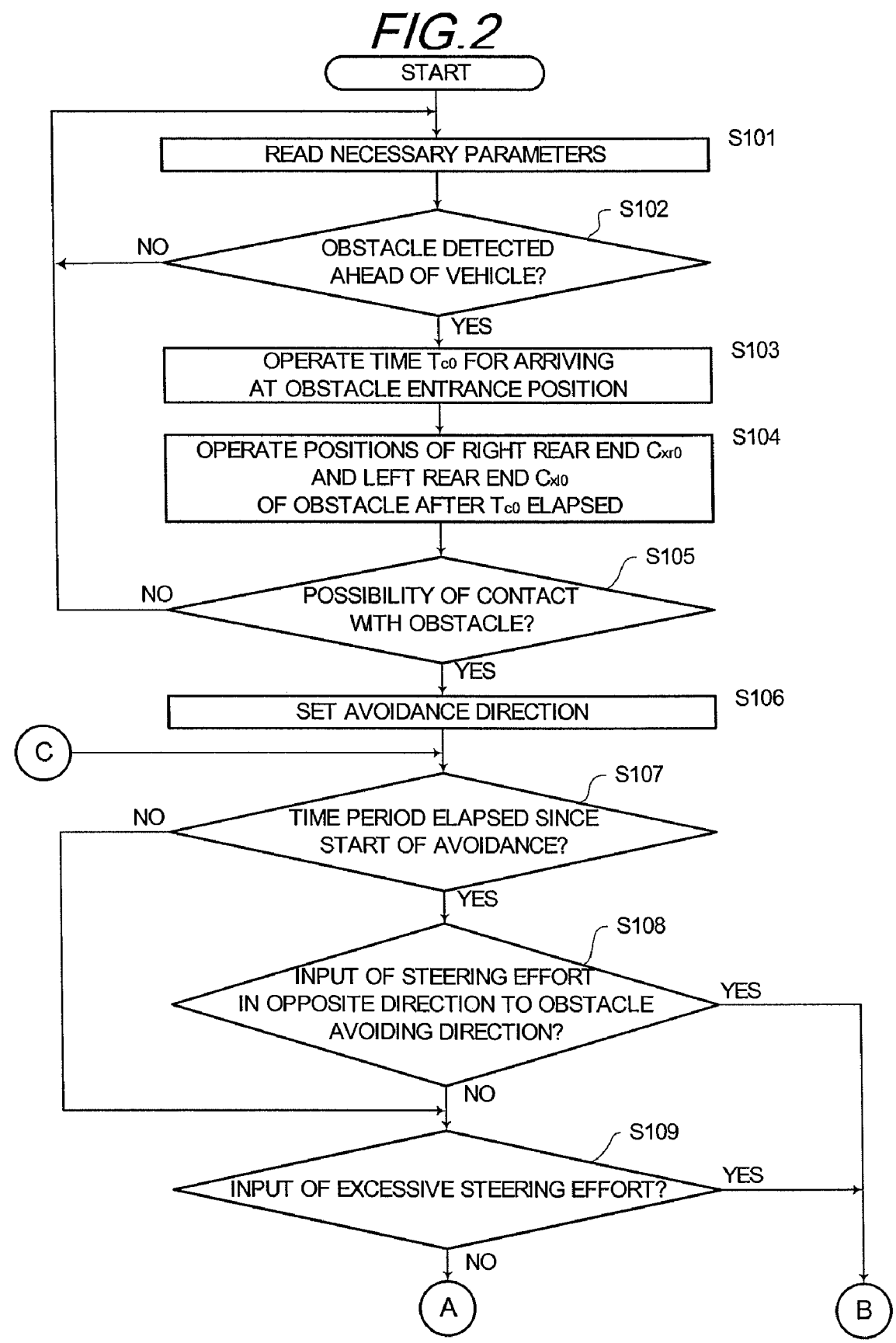
FIG. 2 is a flowchart of an avoidance driving control program.
Figure 3:
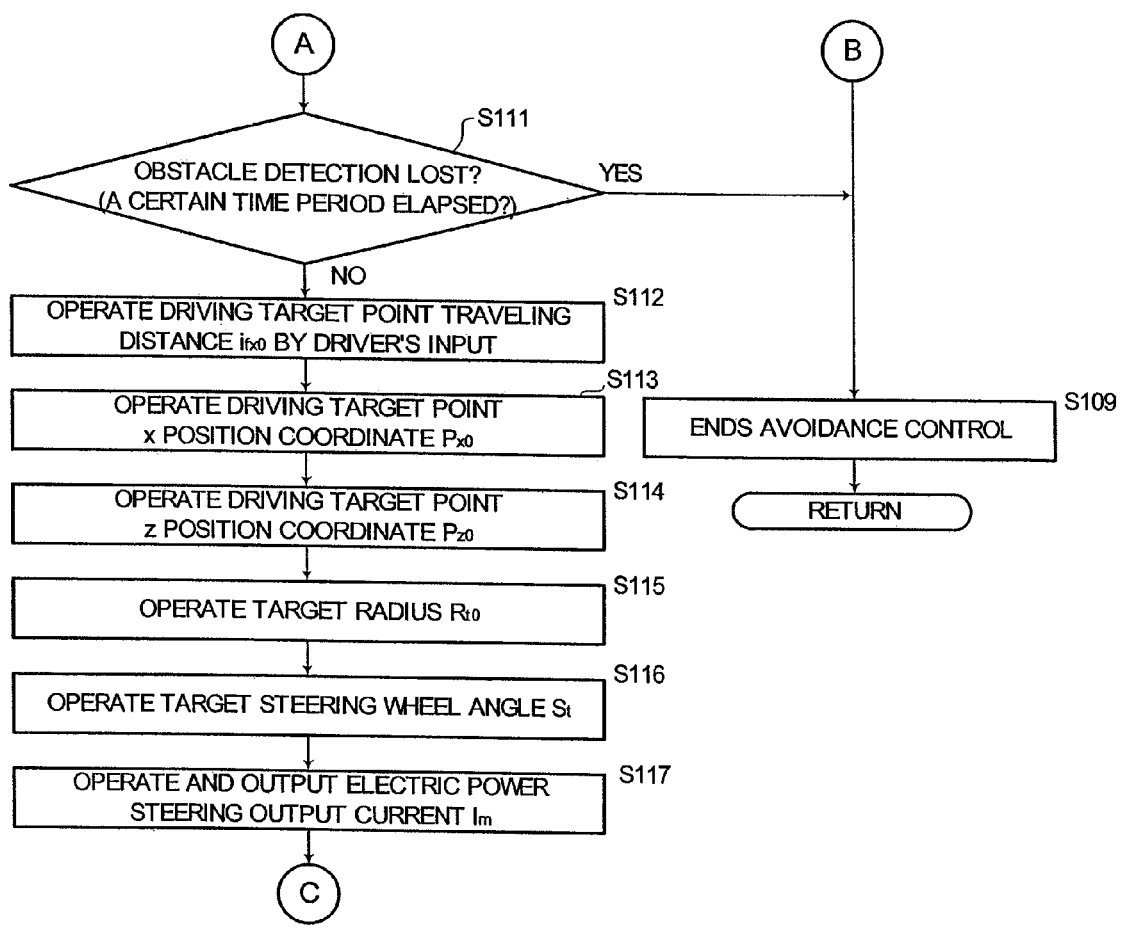
FIG. 3 is a flowchart continued from FIG. 2.
Figure 4:
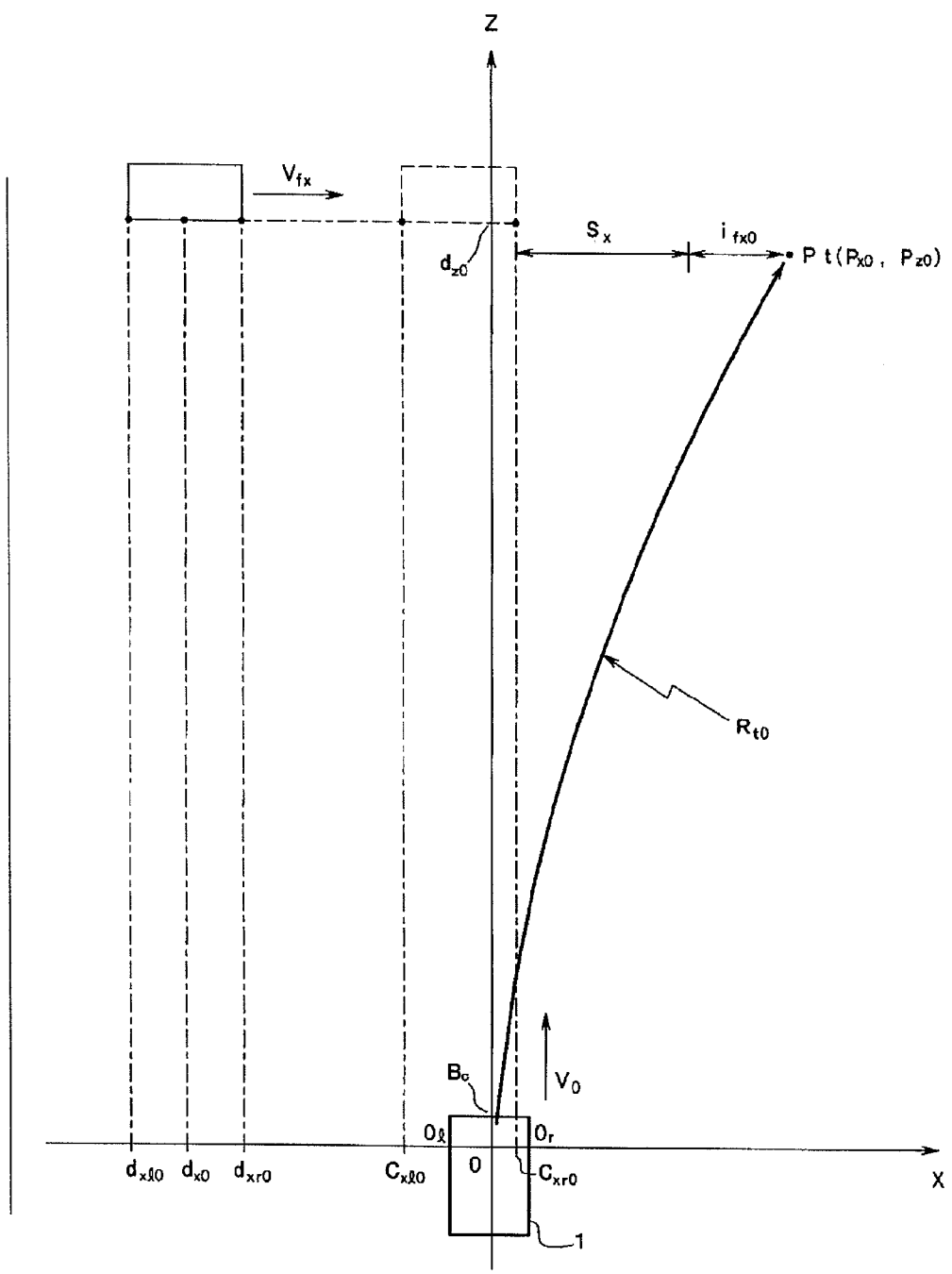
FIG. 4 is an explanatory drawing showing a coordinate system about the subject vehicle and a driving target point.

FIG. 1 is a schematic explanatory drawing which illustrates an entirety of a vehicle driving control unit. FIG. 2 is a flowchart of an avoidance driving control program. FIG. 3 is a flowchart which continues from FIG. 2. FIG. 4 is an explanatory drawing which explains a coordinate system around a subject vehicle and a driving target point. FIGS. 5(a) to 5(f) are explanatory drawings of an avoidance direction determination.

In FIG. 1, reference numeral 1 denotes a vehicle such as a motor vehicle (the subject vehicle). A driving control unit 2 is installed in the subject vehicle 1. In the driving control unit 2, an environment recognition unit 5 having functions as a three-dimensional object detection portion and an obstacle recognition portion is connected to a control unit 3 functioning as a driving target setting portion and a control portion. The environment recognition unit 5 recognizes a road environment ahead based on images captured by a stereoscopic camera 4 and inputs white line information and obstacle information into the control unit 3.

Connected to the control unit 3 are sensors such as a vehicle speed sensor 6 for detecting a vehicle speed V0 of the subject vehicle, a steering wheel angle sensor 7 for detecting a steering wheel angle Sr (a rotational angle of a clockwise rotation being detected as (+)), and a steering torque sensor 8 as a a steering torque detection portion for detecting a steering torque f0 exerted by the driver (a clockwise steering torque being detected as (+)), and furthermore, a switch 9 for switching ON and OFF an avoidance driving control and switches such as a brake pedal switch, a accelerator pedal switch, which are both not shown, and the like are also connected to the control unit 3.

In addition, when recognizing an obstacle according to an avoidance driving control program, which will be described later, based on signals input from those sensors and switches, the control unit 3 is configured to operate a driving route based on the position of the subject vehicle 1 and the position of the obstacle, output a signal to an electric power steering control unit 10 which is a steering actuator, cause an avoidance control to be attained by an automatic steering and guide the subject vehicle 1.

In addition, the control unit 3 displays a forward view, the position of the obstacle, an operating state of the avoidance driving control and the like on a liquid crystal display 11 which is provided on, for example, a dashboard. Furthermore, the control unit 3 causes a speaker 12 to produce an alarm to inform the driver that there exist ahead an obstacle with which the subject vehicle is likely to collide or a speech to explain the operating state of avoidance driving control to the driver.

The stereoscopic camera 4 is made up of a set of (left and right) CCD cameras which utilizes, for example, solid state image sensing devices such as charge-coupled devices (CCDs) as a stereo optical system. These left and right CCD cameras are mounted in parallel at a certain interval on the ceiling at the front of a passenger compartment, so as to capture stereoscopic images of a target outside the vehicle from different view points and input the stereoscopic images so captured into the environment recognition unit 5.

Operations for processing of the images from the stereoscopic camera 4 will be implemented, for example, in the following manner in the environment recognition unit 5. First, an operation for obtaining distance information from a deviation between corresponding positions of a set of stereoscopic images of an environment in the entering direction of the subject vehicle which has been captured by the CCD cameras of the stereoscopic camera 4 based on the principle of the triangulation is performed on the set of stereoscopic images so captured, so as to generate a distance image which represents a three-dimensional distance distribution. In addition, based on the data, a known grouping operation or comparison with three-dimensional road shape data, side wall data, three-dimensional object data and the like which are stored in advance is performed, and white line data, side wall data which is data of guard rails, curbstones or the like which exist along a road, and three-dimensional object data such as vehicles, pedestrians or the like are extracted. Different numbers are allocated to the different data such as the white line data, the side wall data and the three-dimensional object data so extracted. In addition, the three-dimensional object data is classified into three classifications such as an opposite direction traveling object which travels toward the subject vehicle 1 (in particular, an oncoming vehicle), a stationary object which is at halt, and a forward direction traveling object which travels substantially in the same direction as the subject vehicle from a relationship between a relative variation in distance from the subject vehicle 1 and vehicle speed of the subject vehicle. A distance from the subject vehicle 1 to the obstacle, the position of the obstacle in an X (lateral direction)–Z (longitudinal direction) coordinate system about the camera position of the subject vehicle 1 (refer to FIG. 4, the rightward direction of the subject vehicle 1 being regarded as (+) and the forward direction thereof being regarded as (+)), the speed Vfx of the obstacle in the lateral direction (the rightward direction of the subject vehicle 1 being regarded as (+)), the speed Vfz of the obstacle in the longitudinal direction and the like on a three-dimensional object which exits on an anticipated traveling path of the subject vehicle 1 (an area set predetermined ahead of the subject vehicle 1 based on the current position thereof) and which is closest to the subject vehicle 1 are outputted to the control unit 3 as obstacle information. Here, as to the position of the obstacle, specifically, as is shown in FIG. 4, left rear end coordinates $(d_{xl0}, d_{z0})$, right rear end coordinates $(d_{xr0}, d_{z0})$ and rear central coordinates $(d_{x0}, d_{z0})$ are outputted to the control unit 3.

Next, an avoidance driving control program which is executed by the control unit 3 will be described in detail based on flowcharts shown in FIGS. 2 and 3. This avoidance driving control is such as to be executed when the switch 9 is ON, and hence the control is not executed when the switch 9 is OFF. In addition, in the event that the switch 9 is switched OFF or the brake pedal switch or the accelerator pedal switch is switched ON (the brake pedal is depressed or the accelerator pedal is depressed) during the control, the control is reset in the midst of operation.

Firstly, at step (hereinafter, abbreviated as "S") 101, necessary parameters are read, and the operation flow proceeds to S102, where whether or not an obstacle is detected ahead of the subject vehicle is determined. If an obstacle is determined as being not detected ahead of the subject vehicle as a result, the operations are repeated from S101, whereas if an obstacle is detected, the operation flow proceeds to S103, a time $t_{c0}$ required until the subject vehicle 1 arrives at an obstacle entrance position is operated by, for example, the following equation (1).

$$t_{c0}=((d_{z0}-B_c)/V_0)-t_d \qquad (1)$$

where, as is shown in FIG. 4, Bc denotes a distance from the stereoscopic camera 4 to a front end of a bumper of the subject vehicle, and td denotes a recognition delay time which has been set in advance based on an experiment.

Next, the operation flow proceeds to S104, where the positions of a right rear end $C_{xr0}$ and a left rear end $C_{xl0}$ of the obstacle after the time $t_{c0}$ has elapsed are estimated and operated.

$$C_{xr0}=d_{xr0}+V_{fx}\cdot(t_{c0}+t_d) \qquad (2)$$

$$C_{xl0}=d_{xl0}+V_{fx}\cdot(t_{c0}+t_d) \qquad (3)$$

Next, the operation flow proceeds to S105, a possibility of collision with the obstacle is determined based on the position of the obstacle estimated at S104. Specifically, if conditions, $C_{xl0}<O_r$ and $C_{xr0}>O_l$ ($O_r$ denotes a right end X coordinate of the subject vehicle, $O_l$ denotes a left end X coordinate of the subject vehicle), are established, the possibility of collision is determined as existing.

In addition, if the conditions, $C_{xl0}<O_r$ and $C_{xr0}>O_l$ are not established, the possibility of collision is determined as not existing, and the operations from S101 are repeated, whereas the conditions are established, the possibility of collision is determined as existing, and the operation flow proceeds to operations from S106 onward.

When determining that the possibility of collision exists and proceeding to S106, a direction is set in which the subject vehicle 1 is directed for avoidance of a collision with the obstacle. For example, as is shown in FIGS. 5(a) to 5(f), (a) When $O_l \leq C_{xr0} \leq O_r$, and $C_{xl0}<O_l$, a rightward avoidance is set (FIG. 5(a)).

Figure 5A:
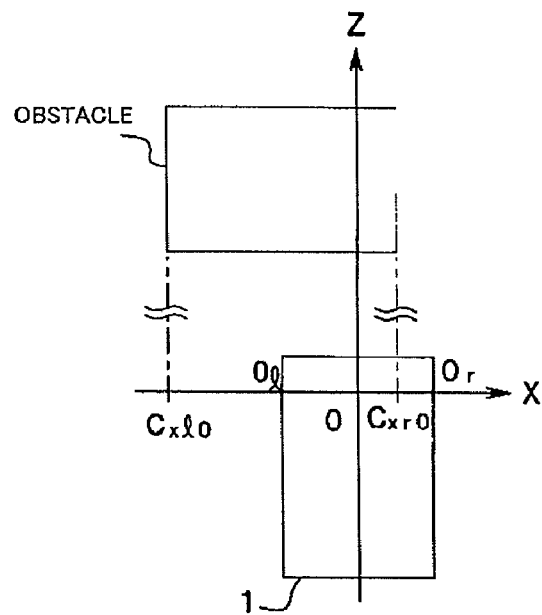
FIGS. 5(a) to 5(f) are explanatory drawings of an avoidance direction determination.
Figure 5B:
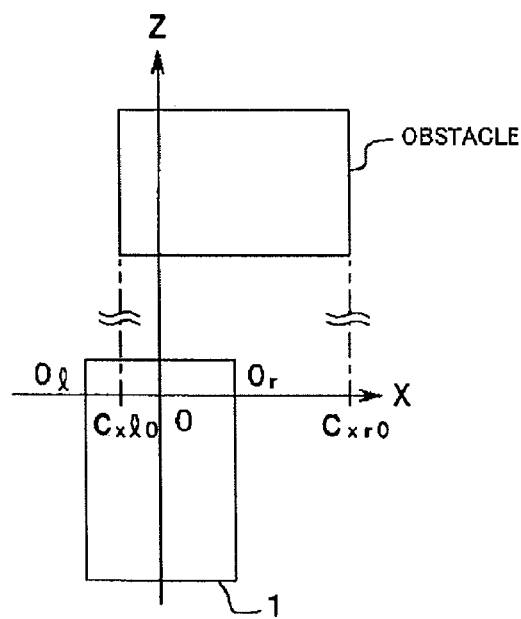

(b) When $O_l \leq C_{xl0} \leq O_r$, and $C_{xr0}>O_r$, a leftward avoidance is set (FIG. 5(b)).

Figure 5C:
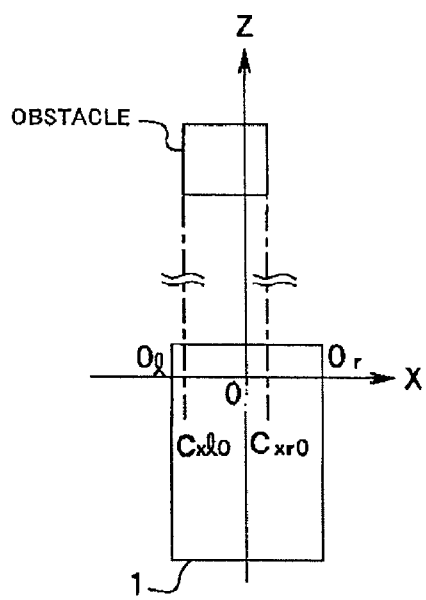

(c) When $O_l \leq C_{xl0} \leq O_r$, $O_l \leq C_{xr0} \leq O_r$, and $O_r-C_{xr0} \geq C_{xl0}-O_l$, a rightward avoidance is set (FIG. 5(c)).

Figure 5D:
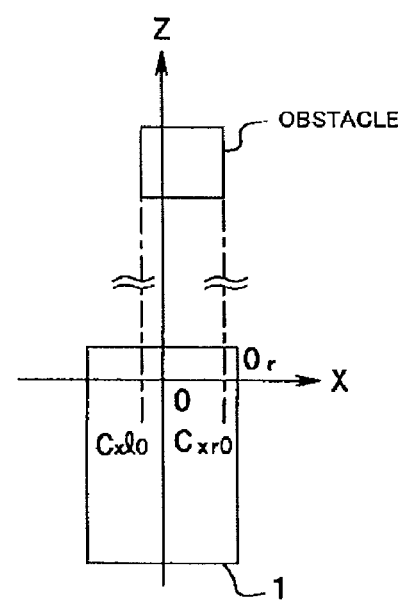

(d) When $O_l \leq C_{xl0} \leq O_r$, $O_l \leq C_{xr0} \leq O_r$, and $O_r-C_{xr0}<C_{xl0}-O_l$, a leftward avoidance is set (FIG. 5(d)).

Figure 5E:
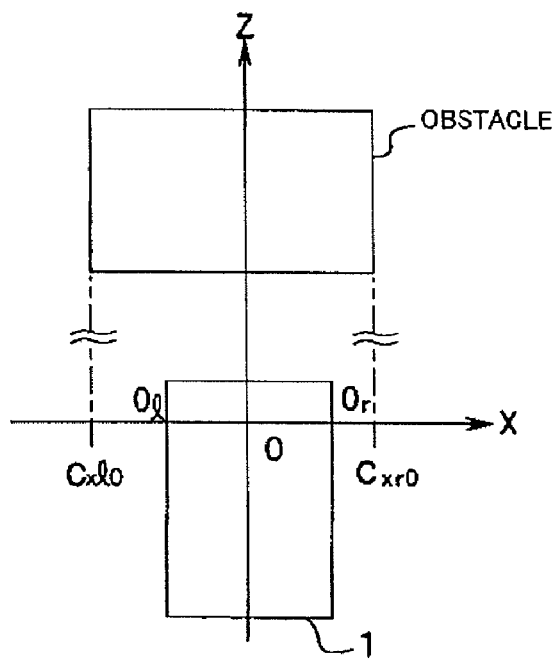

(e) When $C_{xl0}<O_l$, $C_{xr0}>O_r$, and $C_{xr0}-O_r \leq C_{xl0}-O_l$, a rightward avoidance is set (FIG. 5(e)).

Figure 5F:
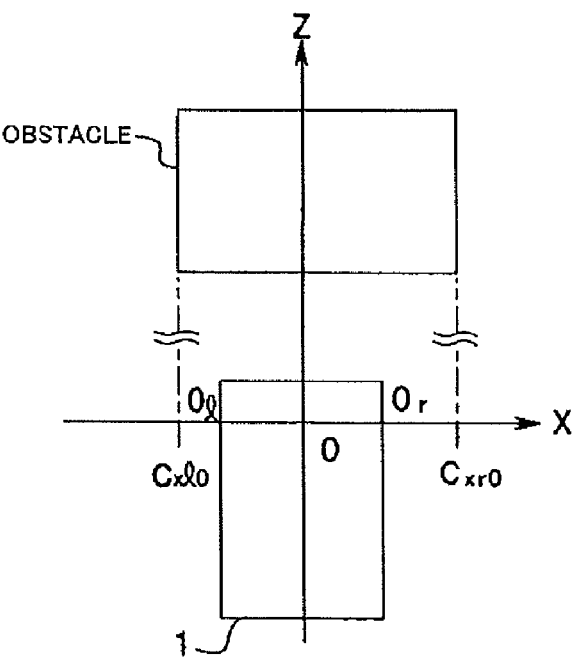

(f) When $C_{xl0}<O_l$, $C_{xr0}>O_r$, and $C_{xr0}-O_r>O_l-C_{xl0}$, a leftward avoidance is set (FIG. 5(f)).

Next, the operation flow proceeds to S107, where whether or a preset certain period (for example, 1 sec) has elapsed since the avoidance control was started is determined, and if the certain period is determined as having elapsed, the operation flow proceeds to S108, whereas if the certain period is determined as not having elapsed, skipping S108, the operation flow proceeds to S110.

The operation at S108 is an operation for determining whether or not there is a steering effort input by the driver in an opposite direction to the direction in which the obstacle is to be avoided (for example, an input of a steering torque $f_0$ in which the absolute value of the steering torque $f_0$ is equal to or less than a predetermined $T_{c1}$) is determined, and if it is determined that there is a steering input by the driver in an opposite direction to the direction in which the obstacle is to be avoided after a certain time period has been elapsed, since it can be judged that the driver purposely attempts to travel in the direction of the obstacle rather than attempting to avoid the obstacle, the operation flow proceeds to S109, where the avoidance control is ended, and the parameters (the parameters which will be set at steps S112 to S117 as will be described later) which were operated in the avoidance control are cleared, leaving the program.

Here, the reason the operation at S108 is not executed until the certain time period has elapsed is that in the event that an automatic steering is performed immediately the avoidance has been started, there occurs an occasion where the driver inputs a steering effort in an opposite direction to the direction in which the automatic steering is performed in reaction to the start of avoidance, and this input of steering effort by the driver is made to be prevented from being taken for as a steering operation toward the obstacle.

If it is determined in S108 that there is no input of steering effort in an opposite direction to the obstacle avoidance direction, the operation flow proceeds to S110, where whether or not there is an input of excessive steering effort (for example, an input of a steering torque $f_0$ in which the absolute value of the steering torque $f_0$ is equal to or more than a predetermined $T_{c2}$, $T_{c1} < T_{c2}$) by the driver is determined, and if there is an input of excessive steering torque by the driver, determining that the driver is attempting to avoid the obstacle by himself or herself or the driver is purposely attempting to steer the vehicle in another direction, the operation flow proceeds to S109, where the avoidance control is ended, and the parameters (the parameters which will be set at steps S112 to S117 as will be described later) which were operated in the avoidance control are cleared, leaving the program.

In addition, if there is no input of excessive steering effort by the driver, the operation flow proceeds to S111, where whether or not a certain time period has elapsed with the obstacle detection being in a lost state, that is, whether or not a state where inputting of a signal which signals that no obstacle exists from the environment recognition unit 5 or an obstacle detection disabled state has continued over the certain period is determined. Then, if the result determines that the certain time period has elapsed with the obstacle detection being in the lost state, the operation flow proceeds to S109, where the avoidance control is ended, and the parameters (the parameters which will be set at steps S112 to S117 as will be described later) which were operated in the avoidance control are cleared, leaving the program.

On the contrary, if the obstacle detection is not in the lost state, or the certain period has not elapsed with the obstacle detection being in the lost state, the operation flow proceeds to S112, a driving target point traveling distance $i_{fx0}$ by the driver input (the steering torque $f_0$) is operated by, for example, the following equation (4).

$$i_{fx0} = G_f f_0 \quad (4)$$

where, G denotes a gain. In addition, the driving target point traveling distance $i_{fx0}$ that is operated by the aforesaid equation (4) is operated only when a steering torque $f_0$ in the same direction as the avoidance direction set at S106 is input. Namely, the driving target point traveling distance $i_{fx0}$ is made to be set in the direction in which the vehicle is directed away from the obstacle in an ensured fashion.

Next, the operation flow proceeds to S113, where an x position coordinate $P_{x0}$ of a driving target point $P_t$ is operated by, for example, the following equation (5) or (6).

When the vehicle is directed for avoidance in a rightward direction to the obstacle $$P_{x0} = V_{fx} \cdot (t_{c0} + t_d) + S_x + \int (i_{fx0}) dt \quad (5)$$

Note that a integral range is from the start of avoidance control to the current time. In addition, $S_x$ denotes a safety spacing that is set in advance.

When the vehicle is directed for avoidance in a leftward direction to the obstacle $$P_{x0} = V_{fx} \cdot (t_{c0} + t_d) - S_x + \int (i_{fx0}) dt \quad (6)$$

Note that a integral range is from the start of avoidance control to the current time.

Since by operating the driving target point $P_t$ by utilizing the integral value of the driving target point traveling distance $i_{fx0}$ with the differential range made to range from the start of avoidance control the current time in the way described above, a necessary driving target point $P_t$ is obtained based on the current steering wheel position, the resulting automatic steering becomes smooth and natural.

In addition, since the driving target point is inevitably set in the position which is apart by $S_x$ from the estimated obstacle position, the avoidance is made to be realized in an ensured fashion.

In addition, although it is preferred that the driving target point $P_t$ is operated by utilizing the integrated value of the driving target point traveling distance $i_{fx0}$ with the integral range made to range from the start of avoidance control to the current time as in the equation (5) or (6), the x position coordinate $P_{x0}$ of the driving target point Pt may be operated by, for example, the following equation (7) or (8) without using the integrated value depending upon the properties of a vehicle.

When the vehicle is directed for avoidance in a rightward direction to the obstacle $$P_{x0} = V_{fx} \cdot (t_{c0} + t_d) + S_x + i_{fx0} \quad (7)$$

When the vehicle is directed for avoidance in a leftward direction to the obstacle $$P_{x0} = V_{fx} \cdot (t_{c0} + t_d) - S_x + i_{fx0} \quad (8)$$

Next, the operation flow proceeds to S114, where a z position coordinate $P_{z0}$ of a driving target point is operated by, for example, the following equation (9).

$$P_{z0} = d_{z0} - V_0 \cdot t_d \quad (9)$$

Next, the operation flow proceeds to S115, a target radius $R_{t0}$ when a route from the current position to the driving target point $P_t$ is assumed to be an circular arc is operated by, for example, the following equation (10) based on the coordinates ($P_{x0}$, $P_{z0}$) of the driving target point $P_t$ which were operated at S113 and S114, respectively.

$$R_{t0} = (P_{x0}^2 + P_{z0}^2)/(2 \cdot P_{x0}) \quad (10)$$

Next, the operation flow proceeds to S116, where a target steering angle St is operated by, for example, the following equation (11).

$$S_t = (L \cdot N_s)/R_{t0} \quad (11)$$

where, L denotes a wheelbase, and $N_s$ denotes a steering gear ratio.

Next, the operation flow proceeds to S117, where an electric power steering output current $I_m$ for the electric power steering system 10 which is the steering actuator is operated by, for example, the following equation (12) so as to be outputted to the electric power steering system 10, and the operations from S107 are repeated again.

$$I_m = G_1 \cdot (S_t - S_r) + G_2 \cdot (d(S_t - S_r)/dt) \tag{12}$$

where, $G_1$, $G_2$ denote gains.

According to the embodiment of the invention that is configured as has been described heretofore, the position of the obstacle is estimated based on the current relative position between the subject vehicle 1 and the obstacle and the information on traveling of the vehicle, and the driving target point Pt is set to the position which results when the driving target point traveling distance $i_{fx0}$ over which the subject vehicle 1 travels in the lateral direction based on the steering torque $f_0$ and the predetermined safety spacing $S_x$. Consequently, since the driving target point $P_t$ is set appropriately according to the driver's intention, the optimum automatic avoidance intended by the driver can be implemented without causing the driver's uncomfortable feeling.

In this embodiment, the obstacle moves vertically to the traveling direction of the subject vehicle at a constant speed. It is desirable to set a driving target point in consideration of the speed of the obstacle in the longitudinal direction or the acceleration of the obstacle and the subject vehicle, if the speed of the obstacle in the longitudinal direction is not zero, or the obstacle or the subject vehicle does not move at constant speed.

What is claimed is:

1. A vehicle driving control unit comprising:
   a three-dimensional object detection portion for detecting three-dimensional objects in a driving environment;
   an obstacle recognition portion for recognizing an obstacle which interferes with traveling of the vehicle among the three-dimensional objects detected by the three-dimensional object detection portion;
   a steering torque detection portion for detecting a steering torque exerted by a driver in said vehicle;
   a driving target setting portion for setting a driving target point on a side of the obstacle recognized by the obstacle recognition portion based on at least the steering torque; and
   a control portion for setting vehicle motion parameters based on a vehicle motion model and controlling an automatic steering control of the vehicle so as to direct the vehicle toward the driving target point,
   wherein the control portion does not cancel the automatic steering control until a preset period has elapsed since the automatic steering control was started, and
   wherein the control portion cancels the automatic steering control when the steering torque in the opposite direction to the direction for avoiding the obstacle is input after the preset period has elapsed since the automatic steering control was started.

2. The driving control unit according to claim 1,
   wherein the driving target setting portion estimates a position of the obstacle after a predetermined period based on a current relative position between the vehicle and the obstacle and information of the traveling of the vehicle and sets the driving target point to a position obtained by adding a traveling distance over which the vehicle travels in a lateral direction based on the steering torque and a preset distance.

3. The vehicle driving control unit according to claim 1,
   wherein the driving target setting portion sets the driving target point based on at least a differential value of the steering torque from a start of the automatic steering control by the control portion.

4. The vehicle driving control unit according to claim 1,
   wherein the driving target setting portion determines an avoidance direction for avoiding the obstacle and sets the driving target point based on the steering torque that is exerted in the avoidance direction.

5. The vehicle driving control unit according to claim 1,
   wherein the control portion cancels the automatic steering control when the steering torque is equal to or larger than the preset threshold value.

6. The vehicle driving control unit according to claim 1, further comprising:
   a judging portion for judging whether the steering torque in an opposite direction to a direction for avoiding the obstacle is input,
   wherein the judging portion does not judge until a preset period has elapsed since the automatic steering control was started.

* * * * *